US010760486B2

(12) United States Patent
Lemarchand et al.

(10) Patent No.: US 10,760,486 B2
(45) Date of Patent: Sep. 1, 2020

(54) TURBINE ENGINE FAN MODULE INCLUDING A TURBINE ENGINE INLET CONE DE-ICING SYSTEM, AND A DE-ICING METHOD

(71) Applicant: Safran Aircraft Engines, Paris (FR)

(72) Inventors: Kevin Morgane Lemarchand, Moissy-cramayel (FR); Nils Bordoni, Moissy-cramayel (FR); Guillaume Kubiak, Moissy-cramayel (FR)

(73) Assignee: Safran Aircraft Engines, Paris (FR)

( * ) Notice: Subject to any disclaimer, the term of this patent is extended or adjusted under 35 U.S.C. 154(b) by 304 days.

(21) Appl. No.: 15/561,116

(22) PCT Filed: Mar. 31, 2016

(86) PCT No.: PCT/FR2016/050719
§ 371 (c)(1),
(2) Date: Sep. 25, 2017

(87) PCT Pub. No.: WO2016/156741
PCT Pub. Date: Oct. 6, 2016

(65) Prior Publication Data
US 2018/0128173 A1 May 10, 2018

(30) Foreign Application Priority Data
Mar. 31, 2015 (FR) ...................... 15 52705

(51) Int. Cl.
*F02C 7/047* (2006.01)
*F02C 7/00* (2006.01)

(52) U.S. Cl.
CPC ............... *F02C 7/047* (2013.01); *F02C 7/00* (2013.01); *F05D 2260/608* (2013.01); *F05D 2260/609* (2013.01); *Y02T 50/672* (2013.01)

(58) Field of Classification Search
CPC ...... F02C 7/047; F02C 7/04; F05D 2260/608; F05D 2260/609
See application file for complete search history.

(56) References Cited

U.S. PATENT DOCUMENTS

| 2,712,727 | A |   | 7/1955 | Morley et al. |           |
|-----------|---|---|--------|---------------|-----------|
| 2,933,886 | A | * | 4/1960 | Sharma ........ | F02C 7/047 |
|           |   |   |        |               | 60/765    |

(Continued)

FOREIGN PATENT DOCUMENTS

| EP | 1662095 A2 | 5/2006 |
| EP | 1840028 A1 | 10/2007 |

OTHER PUBLICATIONS

International Search Report dated Jun. 20, 2016, in International Application No. PCT/FR2016/050719 (3 pages).

*Primary Examiner* — William H Rodriguez
*Assistant Examiner* — Thomas P Burke
(74) *Attorney, Agent, or Firm* — Bookoff McAndrews, PLLC

(57) ABSTRACT

The invention relates to an aviation turbine engine fan module including a de-icing system (10) for de-icing an inlet cone (1) and comprising a sheath (30) placed inside an inside space defined upstream by the inlet cone, said sheath comprising a first duct (38) having at least one hot air admission orifice (42), said first duct being configured to convey hot air from a bearing enclosure (22) of the engine towards a wall of the inlet cone in order to heat it from the inside, the sheath further comprising a second duct (40) having at least one outlet situated downstream from the admission orifice of the first duct, said second duct being configured to discharge air from the first duct towards the downstream end of the engine. The invention also provides a method of de-icing a turbine engine inlet cone.

10 Claims, 3 Drawing Sheets

(56) References Cited

U.S. PATENT DOCUMENTS

| | | | | |
|---|---|---|---|---|
| 3,925,979 A | * | 12/1975 | Ziegler | F02C 7/047 |
| | | | | 60/785 |
| 4,546,604 A | | 10/1985 | Moore et al. | |
| 4,941,317 A | * | 7/1990 | Ivey | F01D 5/085 |
| | | | | 416/95 |
| 2006/0138779 A1 | * | 6/2006 | Bouiller | F01D 15/10 |
| | | | | 290/52 |
| 2007/0220899 A1 | | 9/2007 | Earith Thomas et al. | |
| 2008/0279688 A1 | | 11/2008 | Jensen et al. | |

* cited by examiner

FIG.1
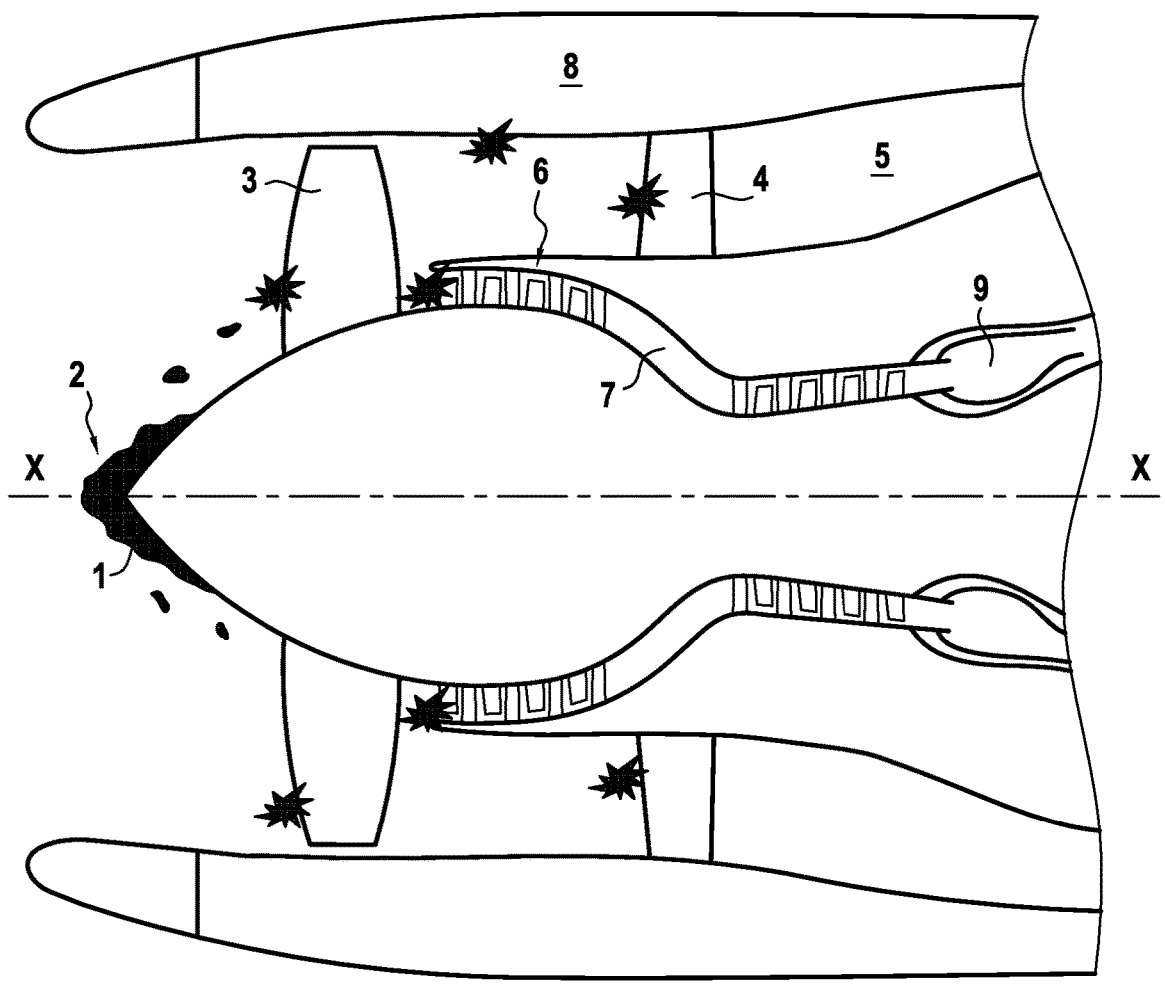
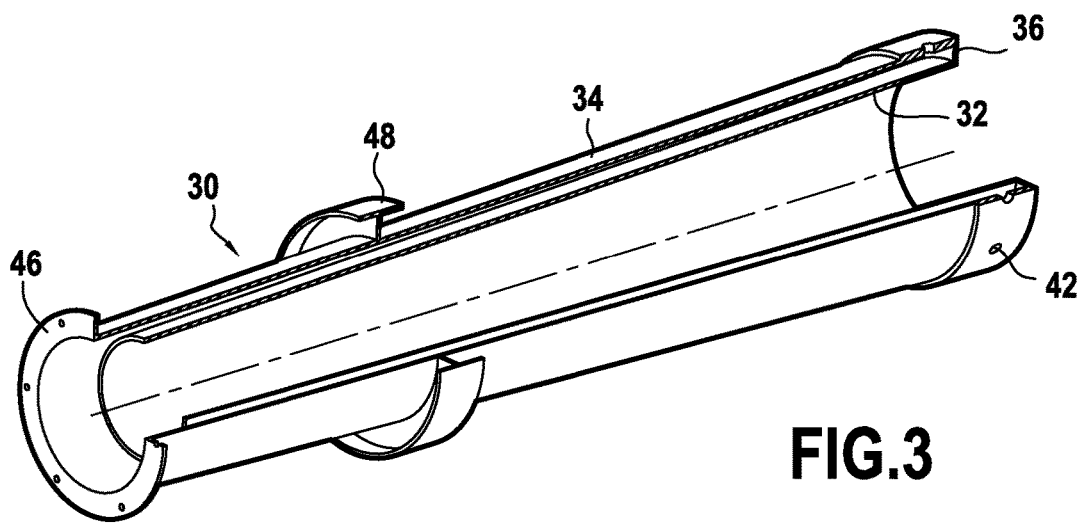
FIG.3

TURBINE ENGINE FAN MODULE INCLUDING A TURBINE ENGINE INLET CONE DE-ICING SYSTEM, AND A DE-ICING METHOD

CROSS-REFERENCE TO RELATED APPLICATIONS

This application is the U.S. national phase entry under 35 U.S.C. § 371 of International Application No. PCT/FR2016/050719, filed on Mar. 31, 2016, which claims priority to French Patent Application No. 1552705, filed on Mar. 31, 2015, the entireties of which are herein incorporated by reference.

BACKGROUND OF THE INVENTION

The present invention relates to the general field of aviation turbine engines.

The invention relates more particularly to a system for de-icing an inlet cone of an aviation turbine engine having a ducted fan.

During certain stages of flight, and in particular at high altitudes where temperatures are low, blocks of ice of large size frequently form on certain portions of the engine, and in particular on the inlet cone.

FIG. 1 is a simplified section view of an aviation turbine engine having a ducted fan centered on a longitudinal axis X-X, and it shows the risks associated with a block of ice 2 forming on an inlet cone 1. In this figure, it can be seen that pieces of ice becoming detached from the block of ice 2 can give rise to impacts against pieces of equipment further downstream such as a fan blade 3, an outlet guide vane (OGV) 4 in the bypass passage 5, blades of a compressor 6 in the primary passage 7, and acoustic panels situated on the fairing of the fan 8, and can even be ingested in the primary passage 7, reaching the combustion chamber 9 with the resulting risk of extinguishing combustion.

Parts that are nowadays made for the most part out of composite material for reasons of performance of weight, such as the fan blades, the guide vanes, or the compressor blades are also more sensitive to such impacts than are parts made of metal.

The consequences of a block of ice that has formed on the inlet cone becoming detached can thus be expensive in terms of maintenance and replacing damaged parts, and can also degrade the performance and the reliability of the turbine engine, which might flame out if a block of large size is ingested.

It is therefore desirable to have a de-icing system that serves to prevent blocks of ice forming on the inlet cone, or at very least to reduce their size.

Document EP 1 840 028 discloses a system for de-icing a turbine engine inlet cone for aircraft in which hot air taken from a bearing enclosure of the engine is taken towards the inlet cone in order to heat it. The device described in that document makes provision in particular for discharging the hot air delivered to the inlet cone into the primary and bypass passages of the engine via openings situated in the inlet cone.

Nevertheless, such a solution can present certain drawbacks. In particular when the fan blades are made of composite material, the hot air coming from the de-icing system (which operates as soon as the turbine engine has started) heats the roots of the blades and creates a temperature gradient between the roots and the tips of the blades, which can degrade their mechanical strength.

Furthermore, the hot air coming from the de-icing system can be ingested by the primary passage, which can degrade the overall performance of the engine.

Finally, droplets of oil coming from the lubrication bearing enclosure might be present in this discharged hot air. If such droplets are then ingested in the primary passage of the engine, they can give rise to risks of corrosion and/or oxidation of metal parts present in the primary passage and to degraded overall performance of the engine.

OBJECT AND SUMMARY OF THE INVENTION

A main object of the present invention is thus to mitigate such drawbacks by proposing an aviation turbine engine fan module including a de-icing system for de-icing an inlet cone, said de-icing system comprising a sheath placed inside an inside space defined upstream by the inlet cone, said sheath comprising a first duct having at least one hot air admission orifice, said first duct being configured to convey hot air from a bearing enclosure of the engine towards a wall of the inlet cone in order to heat it from the inside. In accordance with the invention, the sheath further comprises a second duct having at least one outlet situated downstream from the admission orifice of the first duct, said second duct being configured to discharge air from the first duct towards the downstream end of the engine.

The term "fan module" is used to mean the module of the engine that comprises the fan, the low pressure compressor (sometimes referred to as a "booster"), the fan drive shaft, and the fan casing.

As a result, a de-icing system is made available that enables hot air conveying heat generated by the rolling bearings (e.g. ball bearings or roller bearings) present in a lubrication bearing enclosure, possibly together with gearing, to be recovered and conveyed via the first duct towards the inside of the wall of the inlet cone in order to heat it. This is made possible in part by the pressure that exists in any event around the bearing enclosure in order to confine oil inside the enclosure. The de-icing system of the invention therefore does not require any additional device to pressurize the air, and therefore it does not degrade the performance of the engine. Furthermore, the de-icing system is active as soon as the engine is in operation, and in particular no additional control is required.

The sheath of the de-icing system of the invention further comprises a second duct having its outlet further downstream (relative to the flow direction of gas streams through the engine) than the admission orifice of the first duct. Since the sheath is situated in an inside space defined by the inlet cone and also by the fan drive shaft, this second duct serves to discharge the air that is cooled in the inlet cone towards the downstream end of the engine. The air as cooled in this way is discharged, e.g. by flowing in a low pressure rotor shaft, and it can be reused for performing other functions, in particular for pressurizing another bearing enclosure, or indeed for cooling portions of the engine that are further downstream, such as a turbine disk.

In an embodiment of the invention, the sheath comprises:
an inner tube centered on a longitudinal axis of the engine; and
an outer tube arranged coaxially around the inner tube, the first duct being defined radially between the inner tube and the outer tube and being closed at a downstream end by an annular plate extending radially between the inner tube and the outer tube, the second duct being defined by the inside of the inner tube.

Advantageously, the de-icing system further comprises at least one de-oiling system between the bearing enclosure and the first duct. It is thus possible to combine a conventional de-oiling function with a function of de-icing the inlet cone.

Preferably, the de-oiling system comprises at least one chimney mounted in leaktight manner at one end on the outer tube facing an admission orifice of the first duct so as to open out therein, said chimney being for opening out at another end inside the bearing enclosure.

Preferably, the inner tube and the outer tube are each of circular cross-section and of diameter that increases from upstream to downstream.

By means of such a provision, any droplets of oil that might still be present in the air flowing in the ducts are caused by centrifugal force to condense on the walls of the tubes and are taken downstream so that the oil as recovered in this way can return into a bearing enclosure. This serves to avoid losses of oil and to avoid oil being expelled to the outside of the engine.

The outer tube may be fastened in leaktight manner to the inlet cone by a flange situated at an upstream end of said outer tube.

Preferably, the module further includes a fan drive shaft defining the downstream end of the inside space, the de-icing system further including a sealing collar serving to hold the sheath in leaktight manner within the fan drive shaft. Such a collar serves in particular to ensure that the sheath is held in position within the fan drive shaft. In addition, the leaktight connection makes it possible to avoid air that contains traces of oil escaping from the de-icing and air discharge ducts, and also serves to damp any vibration that might be generated by the rotation of the sheath.

The invention also provides a de-icing method for de-icing an aviation turbine engine inlet cone, the method comprising using a first duct to convey hot air taken from the inside of a bearing enclosure to a wall of the inlet cone of the engine in order to heat said inlet cone from the inside. In accordance with the invention, the method further comprises discharging the air from the first duct via a second duct from the inlet cone towards the downstream end of the engine, the air being discharged from upstream to downstream by flowing inside at least one rotor shaft of the engine.

Preferably, the method further comprises de-oiling the hot air taken from the inside of the bearing enclosure.

More preferably, the air discharged by the second duct is used to cool at least one member of the engine. By way of example, such a member may be reduction gearing, a low pressure rotor shaft, or a turbine disk.

BRIEF DESCRIPTION OF THE DRAWINGS

Other characteristics and advantages of the present invention appear from the following description made with reference to the accompanying drawings which show an embodiment having no limiting character. In the figures:

FIG. 1, described above, is a diagrammatic section view of an upstream portion of a turbine engine showing the damage that can result from ice forming on the inlet cone;

FIG. 3 is a perspective view of a sheath in an embodiment of the invention; and

DETAILED DESCRIPTION OF THE INVENTION

Figure 2:
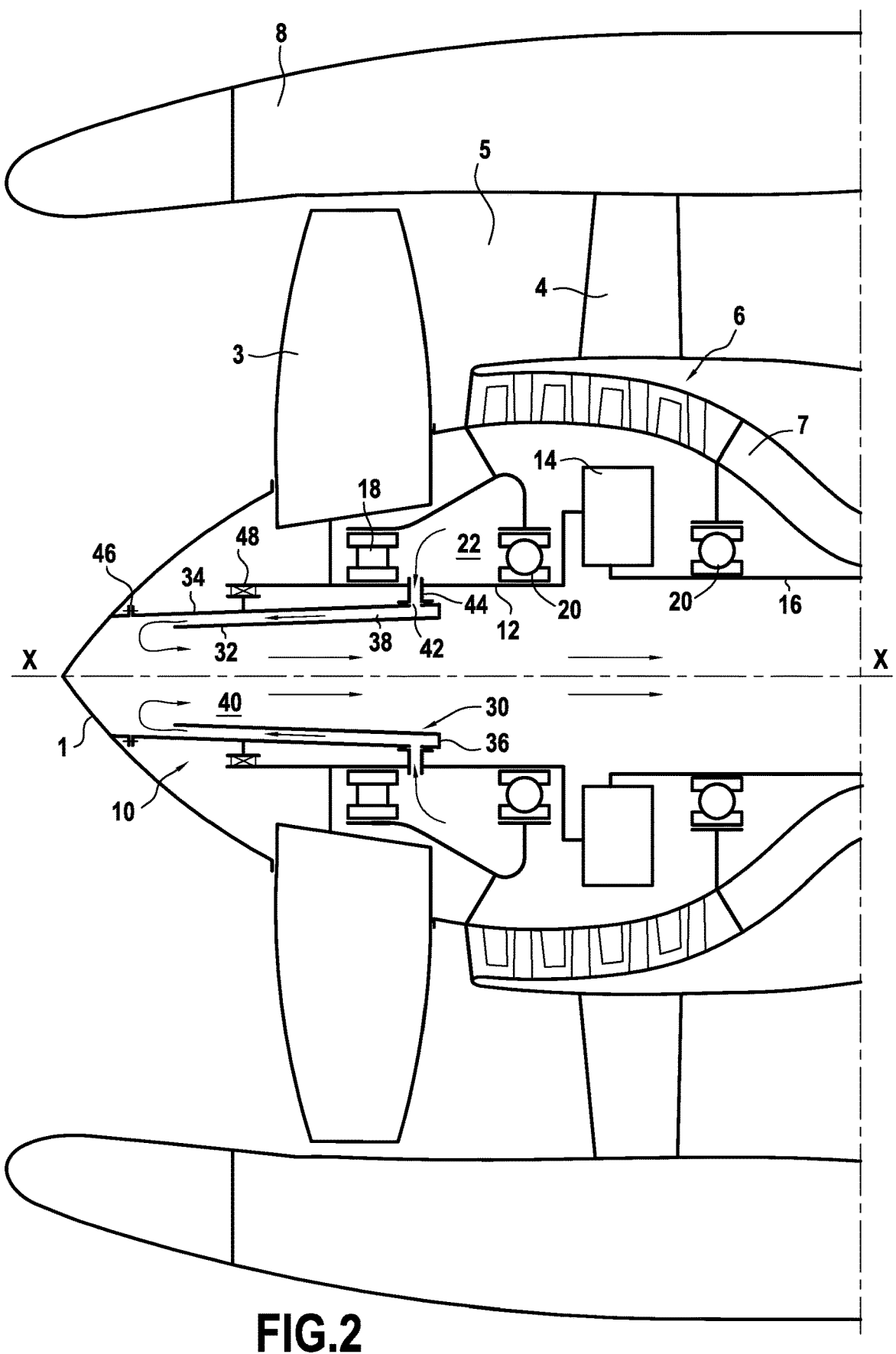
FIG. 2 is a diagrammatic section view of an upstream portion of a turbine engine including a de-icing system of the invention.

With reference to FIG. 2, an upstream portion of an aviation turbine engine with a ducted fan to which the invention applies is shown diagrammatically in cross-section.

In the present description, upstream and downstream are defined relative to the general flow direction of air through the engine.

In known manner, the engine shown in the figure comprises: a fan 3 that is surrounded by a nacelle 8 serving in particular to form a fairing for the fan, and that is driven in rotation by a drive shaft 12 that may be mounted on reduction gearing 14 (e.g. an epicyclic gear train), itself connected to a low pressure rotor shaft 16 of the engine. The shafts 12 and 16 are on the same axis, being centered on the longitudinal axis X-X of the engine.

In addition, the engine has an inlet cone 1 serving in particular to deflect the air stream entering the engine towards the blades of the fan 3. This air stream is then split into two: a primary stream (or hot stream) for flowing in the primary passage 7, and a secondary stream (or cold stream) for flowing in the bypass passage 5. In known manner, the primary passage 7 includes at its inlet a low pressure compressor 6 (also known as a "booster"), and the bypass passage 5 also includes outlet guide vanes (OGVs) 4.

Rolling bearings 18, 20 (e.g. ball bearings or roller bearings) are provided to support the various moving portions of the engine in rotation. These rolling bearings, and also the gearing 14 need to be lubricated permanently. This lubrication is performed with a lubricating liquid (e.g. oil) that is injected into pressurized bearing enclosures 22. The bearing enclosures 22 are defined at their ends in particular by sealing gaskets (not shown). These gaskets separate the bearing enclosures from pressurized portions of the engine (the pressurized air usually being taken from the primary passage, e.g. from a high pressure compressor). The pressurized air present outside these sealing gaskets thus serves to confine oil droplets inside these bearing enclosures.

In accordance with the invention, a de-icing system 10 is provided to prevent blocks of ice forming on the inlet cone 1 (or at least to reduce their size). The de-icing system comprises a sheath 30 constrained to rotate with the fan drive shaft 12, and an embodiment of the sheath is shown in FIGS. 2 and 3.

The sheath 30 is arranged inside an inside space of the engine defined upstream by the inlet cone 1 and downstream by the fan drive shaft 12.

In this embodiment, the sheath 30 has an inner tube 32 and an outer tube 34 centered on the axis X-X of the engine. The outer tube 34 is arranged around the inner tube 32, being coaxial therewith.

The sheath 30 also has a downstream annular plate 36 that extends substantially radially between the downstream ends of the inner and outer tubes 32 and 34. In the example shown, the downstream ends of the tubes 32 and 34 lie in the same transverse plane, however other configurations are possible if the outer tube presents a length different from the length of the inner tube.

With this configuration, a first duct 38 in the meaning of the invention is defined radially between the inner tube 32 and the outer tube 34, and a second duct 40 is defined at least in part by the inside of the inner tube 32. As a result, the annular plate 36 obstructs the first duct at its downstream end.

The first duct 38 has downstream admission orifices 42 allowing air heated by the rolling bearings 18, 20 and by the gearing 14 present in the bearing enclosure 22 to enter into the first duct.

Arrows in FIG. 2 inside the first and second ducts 38 and 40 show diagrammatically the path followed by the air through the de-icing system 10 from the bearing enclosure 22 to the inside of the low pressure rotor shaft 16.

Air is admitted into the inside of the first duct 38 via a de-oiling system, e.g. constituted by chimneys 44 opening out into the inside of the bearing enclosure 22 at one end and opening out facing admission orifices 42 of the first duct 38 at the other end. The principle of this de-oiling system is known and is not described in greater detail herein, with such a system being described by way of example in Document EP 1 662 095.

The hot air then flows inside the first duct 38 from downstream to upstream in order to impact against the inlet cone 1 at the outlet from the duct. Heat exchanged between this hot air and the inside wall of the inlet cone 1 serves to heat the cone and to avoid ice forming (or at least to reduce the size of the ice).

The second duct 40 is in communication with the first duct and it has its inlet at the outlet from the first duct 38. This second duct 30 is centered on the axis X-X of the engine and its outlet is situated further downstream than the air admission orifices 42 of the first duct 38.

Air coming from the first duct 38 and that has heated the inlet cone 1 travels along the second duct 40 going from upstream to downstream and it is then discharged towards the downstream end of the engine by flowing inside the engine, and in particular inside the low pressure rotor shaft 16. As a result, the air that is cooled by the inlet cone can be used for cooling portions further downstream, such as a turbine disk or another bearing enclosure.

The sheath 30 is held radially downstream by the chimneys 44 that bear in leaktight manner against the outer tube 34 at the air admission orifices 42 of the first duct 38 (these admission orifices being formed in an annular surface at the downstream end of the outer tube 34). By way of example, leaktightness may be achieved using O-rings.

At its upstream end the sheath 30 includes a flange 46 enabling the sheath to be fastened to the inlet cone 1 in leaktight manner. Naturally, other fastener means could be envisaged.

Furthermore, a sealing collar 48 is present on the outside surface of the outer tube 34 in an intermediate zone between the flange 46 and the admission orifices 42. This collar bears in leaktight manner against the fan drive sheath 12 in order to hold the sheath radially in position inside the shaft, in order to take up any stresses in operation, and in order to avoid oil leaving the de-icing system. Leaktightness between the drive shaft and the collar may be achieved in the same manner as above by means of O-rings.

In the example shown, the tubes 32 and 34 are not cylindrical, but rather of circular cross-section of diameter that increases going from upstream to downstream. In other words, the tubes are in the shape of truncated cones having their apexes pointing towards the upstream end of the engine.

When the air entering the ducts 38 and 40 is not completely de-oiled, this advantageous configuration enables oil that condenses on the walls of the tubes to be recovered and conveyed towards a bearing enclosure by centrifugal force.

Furthermore, this frustoconical shape makes it possible to avoid oil stagnating in the ducts 38 and 40 where it could create an undesirable unbalance (the sheath 30 is driven in rotation by the fan drive shaft 12).

FIG. 3 is a perspective view of the sheath 30.

This figure shows in particular the admission orifices 42 constituted in this example by holes formed through the outer tube 34 in an annular surface situated at the downstream end of the outer tube.

The invention is not limited solely to turbine engines that include reduction gearing 14, however the presence of such gearing improves the effectiveness of the de-icing system since it makes it possible to further increase the temperature of the air present in the bearing enclosure as a result of the additional friction it generates.

It should be observed that the fan module of the engine fitted with a de-icing system 10 of the kind shown in the figures that constitutes the subject matter of the present invention. The term "fan module" is used to designate the module of the engine that comprises in conventional manner: the fan 3; the low pressure compressor 6 (sometimes referred to as a "booster"); the fan casing 8; and the fan drive shaft 12.

Figure 4:
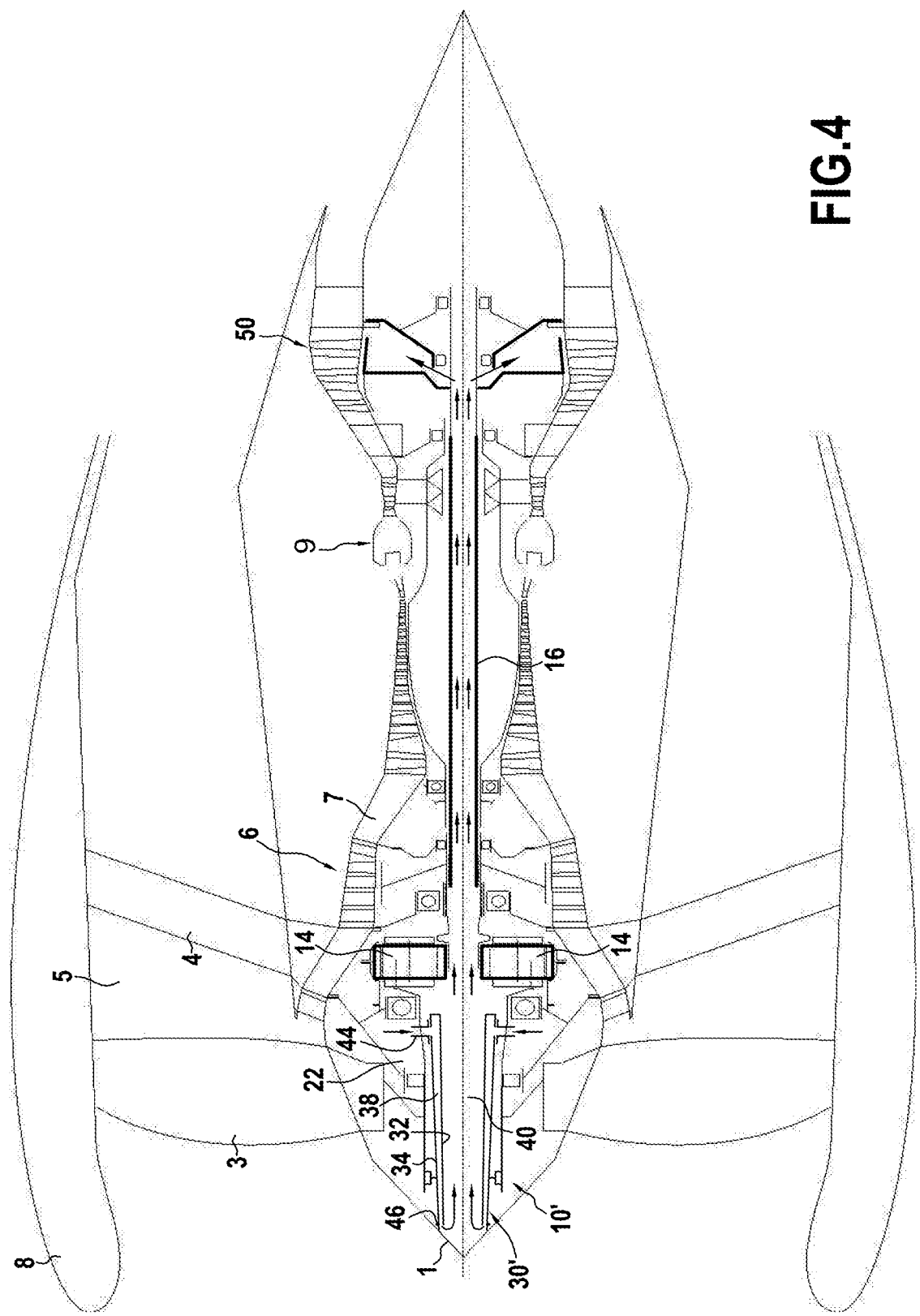
FIG. 4 is a diagrammatic overall view of a turbine engine including a de-icing system in another embodiment of the invention.

FIG. 4 is a diagrammatic overall view of an aviation turbine engine including a fan module fitted with a de-icing system 10' in another embodiment of the invention. The de-icing system 10' comprises in particular a sheath 30' having a first duct 38 and a second duct 40, in similar manner to the above-described de-icing system 10. The sheath 30' may be fastened to the inlet cone 1 by a flange 46. In this example the sheath 30' comprises an inner tube 32 and an outer tube 34 that are coaxial and frustoconical in shape, the larger diameters of said tubes 32 and 34 being situated downstream. Unlike the sheath 30, the inner tube 32 of the sheath 30' presents an upstream end that is situated axially at the same level as the upstream end of the outer tube 34 so that an outlet of the first duct 38 is as close as possible to the inlet cone. This serves to further improve de-icing of the inlet cone.

In a variant, in a configuration that is not shown, the inner tube 32 may project beyond the outer tube 34 at the upstream end, still to ensure that the outlet from the first duct 38 is even closer to the inlet cone 1.

FIG. 4 shows the path followed by the air from the bearing enclosure 22, as represented diagrammatically by a set of arrows. The path followed by the air may be the same regardless of which sheath 30 or 30' is used. Air coming from the bearing enclosure 22 is de-oiled by the chimneys 44, and then travels inside the first duct 38 so as to come into contact with the inlet cone 1. The air cools down on heating the inlet cone prior to entering into the second duct 40. The cooled air is then discharged via the second duct 40 towards the downstream end of the engine and, as it passes, it can cool members of the engine that are situated further downstream from the sheath 30, 30'. By way of example, such members may comprise: the gearing 14; the low pressure rotor shaft 16; and a high pressure turbine 50 (shown in FIG. 4). Thus, with a de-icing system 10, 10' of the invention, the inlet cone 1 can be used as a source of low temperature for cooling members of the engine by ventilation.

The invention claimed is:

1. An aviation turbine engine fan module including an inlet cone, a lubrication bearing enclosure, and a de-icing system for de-icing the inlet cone, said de-icing system comprising a sheath placed within a space defined in the inlet cone, said sheath comprising a first duct having at least one hot air admission orifice, said first duct being configured to convey hot air from the lubrication bearing enclosure towards a wall of the inlet cone in order to heat the inlet cone from an inside of the inlet cone, wherein the sheath further comprises a second duct having at least one outlet situated downstream from the at least one hot air admission orifice of the first duct, said second duct being configured to discharge the hot air from the first duct towards a downstream end of an engine, wherein the aviation turbine engine fan module further includes a fan drive shaft defining a downstream end of the space, and wherein the de-icing system further includes a sealing collar positioned on an outer surface of the sheath and bearing against the fan drive shaft, the sealing collar serving to hold the sheath in leaktight manner within the fan drive shaft, the sealing collar extends radially outward from the outer surface of the sheath, and wherein the outer surface of the sheath extends substantially parallel to the fan drive shaft.

2. The aviation turbine engine fan module according to claim 1, wherein the sheath comprises:

an inner tube centered on a longitudinal axis of the engine; and an outer tube arranged coaxially around the inner tube, the first duct being defined radially between the inner tube and the outer tube and being closed at a downstream end by an annular plate extending radially between the inner tube and the outer tube, the second duct being defined by an inside of the inner tube.

3. The aviation turbine engine fan module according to claim 1, further comprising at least one de-oiling system between the lubrication bearing enclosure and the first duct.

4. The aviation turbine engine fan module according to claim 3, wherein the de-oiling system comprises at least one chimney mounted in leaktight manner at one end on the outer tube facing an admission orifice of the first duct so as to open out therein, said chimney being for opening out at another end inside the lubrication bearing enclosure.

5. The aviation turbine engine fan module according to claim 2, wherein the inner tube and the outer tube are each of circular cross-section and of diameter that increases from upstream to downstream.

6. The aviation turbine engine fan module according to claim 2, wherein the outer tube is fastened in leaktight manner to the inlet cone by a flange situated at an upstream end of said outer tube.

7. A de-icing method for de-icing an aviation turbine engine inlet cone, the de-icing method comprising using a first duct of a sheath placed within a space defined in the aviation turbine engine inlet cone, said first duct having at least one hot air admission orifice that conveys hot air taken from an inside of a bearing enclosure to a wall of the aviation turbine engine inlet cone of an engine in order to heat said aviation turbine engine inlet cone from an inside of the aviation turbine engine inlet cone, the de-icing method being characterized in that the de-icing method further comprises discharging the hot air from the first duct via a second duct of the sheath from the aviation turbine engine inlet cone towards a downstream end of the engine, the hot air being discharged from upstream to downstream by flowing inside at least one rotor shaft of the engine, the at least one rotor shaft of the engine being coupled to a fan drive shaft, wherein a sealing collar positioned on an outer surface of the sheath and bearing against the fan drive shaft, holds the sheath in leaktight manner within the fan drive shaft, the sealing collar extends radially outward from the outer surface of the sheath, and wherein the outer surface of the sheath extends substantially parallel to the fan drive shaft.

8. The de-icing method according to claim 7, further comprising de-oiling the hot air taken from the inside of the bearing enclosure.

9. The de-icing method according to claim 7, wherein the hot air discharged by the second duct is used to cool at least one member of the engine.

10. The aviation turbine engine fan module according to claim 2, further comprising at least one de-oiling system between the lubrication bearing enclosure and the first duct.

* * * * *